May 20, 1952 — T. E. CAROTHERS — 2,597,448
METHOD OF MAKING DINNERWARE AND APPARATUS THEREFOR
Filed April 24, 1950 — 2 SHEETS—SHEET 1
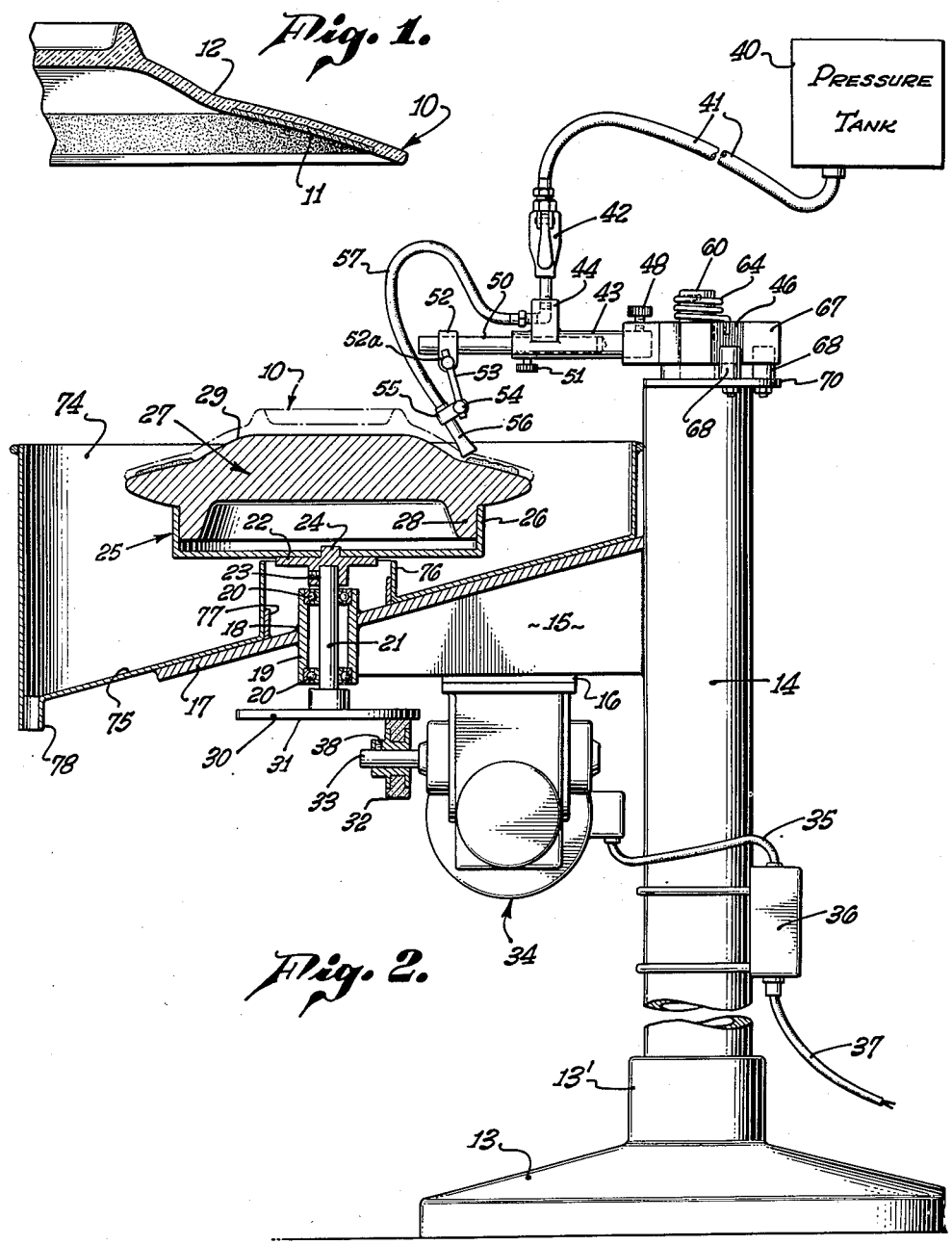
INVENTOR.
THEODORE E. CAROTHERS,
BY
ATTORNEY.

INVENTOR.
THEODORE E. CAROTHERS,
BY
ATTORNEY.

Patented May 20, 1952

2,597,448

UNITED STATES PATENT OFFICE 2,597,448

METHOD OF MAKING DINNERWARE AND APPARATUS THEREFOR

Theodore E. Carothers, Arcadia, Calif., assignor to Gladding, McBean & Co., Los Angeles, Calif., a corporation of California Application April 24, 1950, Serial No. 157,696

7 Claims. (Cl. 25—29)

1

This invention pertains to a novel method of producing articles of dinnerware and embraces exemplary means whereby the method may be carried out. The invention is particularly directed to a method of producing articles of dinnerware characterized by localized areas of great depth and intensity of color. It may also be stated that the invention relates to a method of utilizing clay compositions of different colors, the finished articles including an inlay of ceramic composition having a different color than the body of such article. Two-tone effects can thus be obtained without the necessity of applying differently colored glaze compositions to the article.

The invention pertains to the manufacture of dinnerware from clay compositons or other ceramic compositions giving rise to porcelains and the fine chinaware. It is to be understood that the term clay composition, as used herein, is not limited to a composition consisting solely or essentially of clay since other ceramic compositions involving but minor quantities of clay and consisting essentially of talc, flint, steatite, pyrophyllite, matrix materials high in alkalis, etc. are embraced within this term, the term being directed to any ceramic composition capable of being used in the production of ceramic objects, such as hotel china, fine china, vitrified or semi-vitrified china etc. Similarly the term clay slip, as used hereinafter, refers to any aqueous suspension or dispersion of finely divided ceramic composition whether the solids in such composition consist solely of clays or mixtures of clays with other components, coloring matters, etc.

Heretofore, in the manufacture of dinnerware and other ceramic objects such as plates, saucers, chop plates, soup plates, and the like, wherever it was attempted to produce objects having areas differing in color, such decoration was attained by the use of surface glazes of different coloration. Such surface glazes had to be covered in most instances with a secondary transparent overglaze in order to impart the necessary smoothness to the surface. Surface glazing does not develop a brilliance or depth of color which is attained by the use of a colored ceramic body, the surface of such colored ceramic body being then protected by a transparent over-glaze. It is an object of the present invention to disclose and provide a method whereby articles of dinnerware, including an inlay of ceramic composition of a different color than the body of such articles may be efficiently obtained. The resulting articles, produced in accordance with this invention, are

2 characterized by a great depth and intensity of color. Such articles need not carry glazes of different coloration, since the articles are preferably covered by a single film of transparent glaze. Two-tone effects of unusual beauty can be obtained by the use of this invention.

The invention also pertains to apparatus whereby articles as have been described hereinabove may be produced in a ready and efficient manner.

It is therefore an object of the present invention to disclose and provide rules of procedure, methods of operation, conditions of operation and devices whereby ceramic articles of novel characteristics can be produced. These and various other objects and advantages of the invention will become apparent to those skilled in the art from the contemplation of the examples given hereinafter.

In the drawings:

Fig. 1 is a transverse section through a part of a dinner plate made in accordance with the present invention, said section being enlarged for purposes of illustration.

Fig. 2 is a side elevation of one form of apparatus which may be employed in carrying out the method of the invention.

Figure 3:
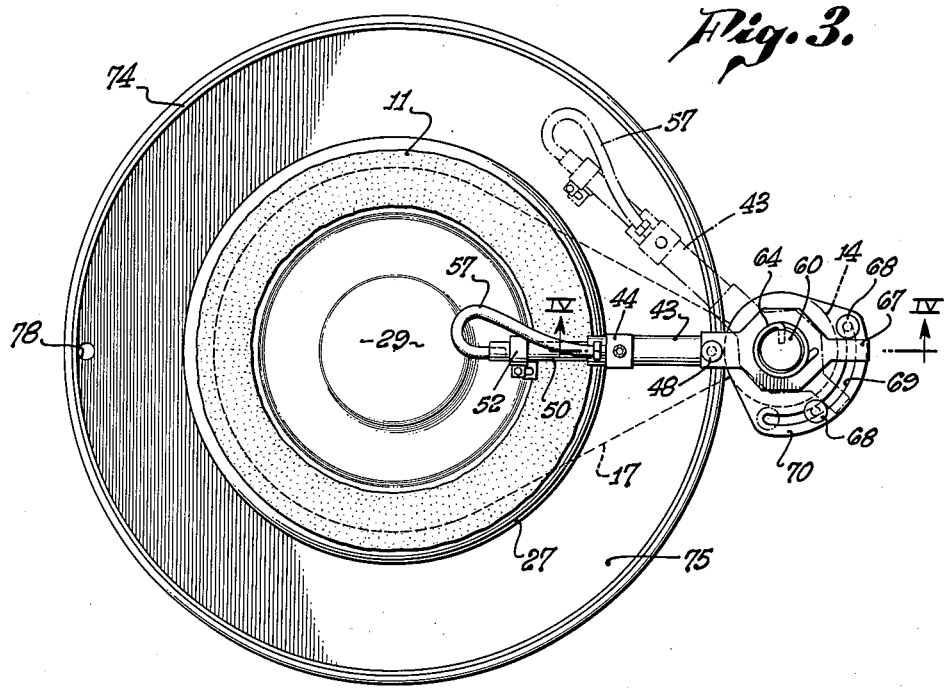
Fig. 3 is a plan view thereof.
Figure 4:
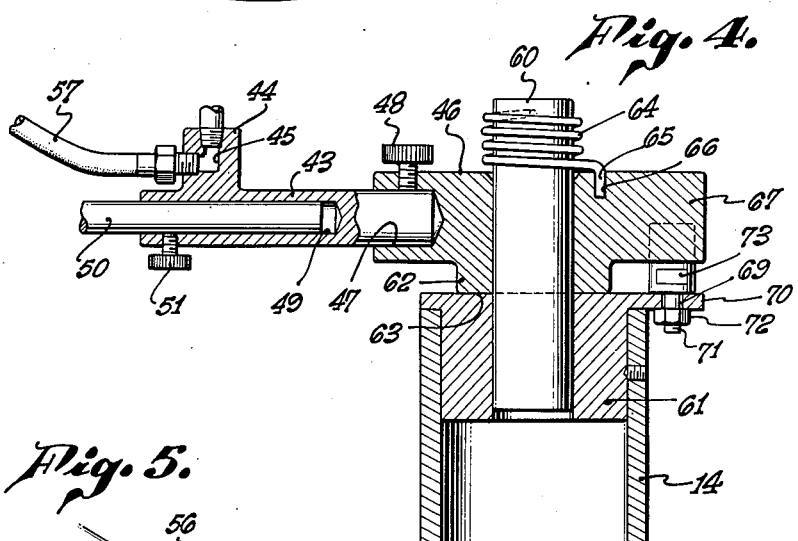
Fig. 4 is an enlarged fragmentary sectional view of the top portion of the standard and arm assembly.
Figure 5:
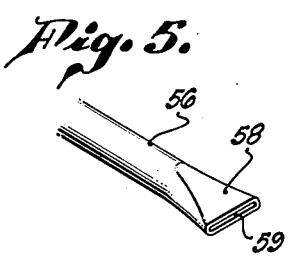
Fig. 5 is an enlarged perspective view of the discharge end of a nozzle employed in this invention.

Generally stated, the present invention contemplates the use of a ceramic composition for the body of the article being manufactured, such ceramic composition being a plastic, formable mass of the character generally used in jiggering or forming, and a clay slip, the clay slip being of a different maturing color than the composition used for the body of the article. When dinnerware is being manufactured, a porous mold (of plaster, steatite composition or the like) having the desired contours for the upper or generally concave surface of the finished articles is rotated about its axis and a clay slip is applied onto the desired and limited portion of the forming surface of the mold so as to deposit a thickness of clay slip thereon. Excess moisture is absorbed from such deposited thickness of clay slip into the mold, but before such slip is permitted to dry, a bat of plastic clay composition is applied over the entire forming surface of the mold, including the previously applied thickness of slip.

The mold so prepared and covered is then jiggered and a desired contour is formed in the surface of the layer of clay composition. After being trimmed and dried the articles so formed may be burned to maturity and it will be found that the thickness of clay slip is thoroughly and intimately bonded to the body of the article. Inasmuch as the slip matured to one color whereas the body matured to another, a two-color effect is obtained. A transparent clear glaze composition may then be applied to the entire bisque and the article burned. It will be found that the resulting coloration of the article is vivid and has exceedingly great depth due to the fact that the color is not only present in a thin surface film but extends into the article itself to an appreciable depth.

The clay slips employed in this method should be bodied, that is, they should have fairly strong jelling characteristics. The clay slips should be of heavier body than the slips normally used in core casting. For example, a clay slip eminently suited for use in this process may have an initial viscosity of about 45 to 55 seconds (time required for 100 ml. to flow through a 4.0 mm. orifice of a separatory funnel) but upon standing fifteen minutes such slip may evidence a viscosity of 75 to 90 seconds. Bodying of slips is well known in the art. These bodied slips permit trimming of the edges of thin film of slip upon the porous mold, so that clear cut and definite lines of demarcation appear between the differently colored areas of the finished article, and insure thorough bonding of the colored slip with the bat of body composition. It may be noted that the thickness of the film or layer of clay slip (after drying) is on the order of 0.01 to 0.05 inch: a time interval of between about 20 seconds and 40 seconds has been observed in practice, between the completion of the deposition of a clay slip on the mold and the application of a bat of body composition thereover. Furthermore, in practice, the bat is forcibly slapped or thrown over the mold and the clay slip decorative element or film.

Referring to the drawings, in Fig. 1 is illustrated an article of dinnerware 10 produced by the method of this invention showing an inlay 11 of clay slip of one color formed in the body 12 of a dinner plate of ceramic composition of a different color. While the inlay is illustrated in the form of an annular thickness of clay slip it will be readily understood that the inlay 11 may be formed of any desired configuration. A single thin, transparent film of glaze covers all surfaces of the finished article.

An exemplary apparatus for carrying out the method of this invention is shown in Fig. 2. A circular heavy base 13 provided with a central hollow annular boss 14 carries an upstanding cylindrical post member or standard 14. The standard 14 is shown as being of fixed height; however, this invention contemplates that the standard may be made of extensible telescopically arranged members for adjusting the working height of the apparatus.

Bracket means provided intermediate the ends of standard 14 comprise a vertical metal web 15 secured to the cylindrical face of standard 14 as by welding, a rectangular flat horizontally disposed motor mounting plate 16 secured by welding to the bottom horizontal edge of web 15, and a flat inclined plate 17 secured by welding to the top inclined edge of web 15. The plate 17 flares outwardly from standard 14 and terminates in a generally semicircular outer portion.

Adjacent the outer vertical edge of web 15, the inclined plate 17 is provided with a circular aperture 18 within which is received and secured a vertically disposed bearing sleeve member 19. The sleeve member 19 carries at each end a roller bearing assembly 20 for rotatably mounting a vertical driven shaft 21. Shaft 21 carries at its upper end an annular flanged fitting 22 suitably secured thereto by a set screw 23. Fitting 22 is provided with an axial upstanding boss 24 having keying means for nonrotatably and removably attaching a mold carrying ring 25 of selected diameter. The ring 25 includes an upstanding circumferential flange 26 adapted to carry a selected porous mold 27 of plaster, steatite composition or the like.

The mold 27 is positioned by a depending annulus 28 cooperable with flange 26 and presents a forming surface 29 of selected configuration for forming the top surface of an article of dinnerware. The highly porous material of mold 27 rapidly absorbs excess moisture from a clay slip composition deposited thereon in the method of this invention.

Secured to the lower end of shaft 21 may be a circular friction driven disc 30 presenting a bottom friction surface 31 lying in virtually a horizontal plane. The surface 31 is frictionally contacted adjacent circumferential margins by a driving wheel 32 provided with suitable anti-friction material and lying in a vertical plane. The driving wheel 32 is adjustably positioned by a set screw 38 along a motor shaft 33 of an electrical motor generally indicated at 34. The adjustability of the radial spacing of the point of contact of the drive wheel with respect to the axis of the driven disc 30 affords means for varying the speed of rotation of the mold-carrying ring 25. Other variable speed driving means may be employed if desired.

The motor is secured in any suitable manner to the motor mounting plate 16 and is suitably connected to an electrical power source by means of cord 35 extending into outlet box 36 which is connected by cord 37 to the electrical source.

Means for applying a bodied clay slip to forming surface 29 of the mold 27 along selected localized areas or portions thereof may include a pressure tank 40 containing a supply of selected clay slip maintained under pressure by any suitable fluid means such as air. Instead of employing a pressure tank for the supply of clay slip it is understood that a tank containing clay slip may be mounted at a suitable height in order to afford a sufficient hydraulic head to obtain desired flow of clay slip from the tank. It is desirable to provide suitable agitating means in the supply tank 40 in order to maintain homogeneity, the agitating means being of a type which will not entrain air in the slip.

A flexible discharge tube 41, leading from the tank, may be provided with a spring-biased valve means 42 of any well-known make and manufacture for controlling flow of clay slip from the tank. The valve is normally biased into closed position and is carried by a horizontally swingable rigid arm assembly including an arm portion 43 provided with an upstanding boss 44 having an internal bore 45 in the form of an elbow in fluid communication with the discharge side of valve means 42. Arm portion 43 is removably secured to a pivoted hub member 46 provided with a recess 47 into which an end of arm portion 43 extends and is secured by set screw 48. The arm portion 43 is provided with an axial bore 49 throughout a greater portion of its length for adjustably and slidably receiving an extension rod 50, said rod being positioned by a set screw 51.

Adjacent the outer end of extension rod 50 a mounting clip 52 carries an adjustably tightened swivel 52a for pivotal connection to one end of a link 53, said link being pivotally connected at its opposite end to a similar swivel 54 by a clip 55 securing a generally tubular nozzle member 56. The nozzle member 56 is connected to an end of a relatively short length of flexible tubing 57 which is suitably connected to the discharge port of elbow 45. The clip, swivel and link assembly carrying the nozzle member 56 may be adjustably positioned vertically above the forming surface of the mold (as shown), or may be preferably positioned at a selected angle of inclination to the forming surface of the mold in order to obtain a desired angle of flow of clay slip onto the forming surface.

It should be noted that nozzle member 56 is provided with a flattened discharge end 58 presenting an elongated generally rectangularly shaped discharge opening 59. This shape of the discharge opening 59 provides flow of a flat thin stream of clay slip for deposit upon the forming surface of the mold. Since the clay slip has a relatively heavy body and fairly strong jelling characteristics, the restricted discharge opening 59 also serves to prevent leakage or further flow of clay slip contained within the flexible tubing 57 after the valve means 42 have been closed. Thus, when valve means 42 is actuated to closed position, flow of clay slip from the nozzle opening 59 immediately stops.

Means are provided for accurately directing flow of clay slip over a selected portion of the forming surface and to make the configuration of deposited clay slip uniform for producing a plurality of virtually identical articles of dinnerware. The hub member 46 is pivoted on an upstanding pin 60 axially formed on an insert member 61 which extends in a close fit into the top of standard 14. The hub member 46 may be provided with a depending boss 62 adapted to seat as at 63 on the top surface of the insert member 61. The hub member 46 and the rigid arm assembly are provided spring-biased swinging movement by means of a coil spring 64 secured at one end to the top portion of pin 60 and at the other end to hub member 46 by bending end 65 of the spring into a suitable recess 66.

Means for selectively adjusting and limiting the angle through which the rigid arm assembly and nozzle member 56 carried thereby may swing includes a projecting lug 67 formed on the hub member 46 diametrically opposite the arm 43. Lug 67 is operable between a pair of arcuately spaced cylindrical stop members 68 adjustably positioned in an arcuate slot 69 formed in a horizontally extending flange 70 provided on insert member 61 to one side of the standard 14. Each stop member 68 includes a depending threaded shank 71 extending through slot 69 and secured by nut 72. A flattened surface 73 on each stop member 68 affords a convenient gripping surface when tightening in selected position. A selected spacing of stop members 68 will positively limit swinging movement of the arm assembly and nozzle by contact of lug 67 therewith.

A drip pan 74, for collecting clay slip not directed upon the mold 27, is provided with an inclined bottom wall 75 for seating upon the inclined plate 17. Drip pan 74 is removably positioned by a central annular vertical flange 76 in engagement with spaced inner stops 77 welded to the plate 17. A discharge outlet 78 at the lowest point in the pan may empty collected clay slip into a suitable container (not shown) placed beneath the outlet.

In the method of using the apparatus described above for producing an article of dinnerware as contemplated by this invention the mold 27 may be rotated at a selected relatively slow speed by suitable adjustment of driving wheel 32 and disc 30. The stop members may then be spaced to permit swinging movement of the arm assembly and nozzle member 56 over a selected localized area of the forming surface of the mold. When mold 27 is rotating at selected speed, value means 42 may be opened to cause flow of clay slip from the pressure tank to the nozzle member 56 and upon the forming surface of the mold to deposit a thickness of clay slip. Since the mold is highly porous and since the mold is rotating at a relatively slow speed, as soon as the clay slip is deposited upon the forming surface, excess moisture is immediately absorbed by the mold and the outer circumferential edge of the deposited clay slip is accurately and immediately defined. The rotation of the mold is such that the centrifugal force acting on the clay slip after it is deposited upon the forming surface is not sufficient to throw the clay slip outwardly. As an operator swings the arm assembly and nozzle member 56 through the selected angle as determined by stop member 68 a thickness of clay slip is deposited on the selected portion of forming surface. The inner circumferential edge of the deposited clay slip is accurately and immediately determined by reason of the rapid rate of absorption of excess moisture in the clay slip into the porous mold. The valve means 42 is then closed to stop flow of clay slip.

The edges of the deposited thickness of clay slip may be trimmed, and other surfaces of the mold sponged off and cleaned. While the deposited clay slip is still moist, a bat of plastic clay composition is applied to the top of the mold. This bat of plastic material is then jiggered in a manner well known to the art to provide a selected contour for the bottom of the dinner plate. The formed article of dinnerware may then be dried and burned to maturity. When removed, it will be readily apparent that the deposited thickness of clay slip is firmly bonded to the body and has provided a color effect having great depth and intensity which is not obtainable by using colored glazes. A clear, transparent over-glaze may then be applied to the article of dinnerware in order to furnish a smooth, clear protective surface.

It should be noted that the tubing 57, conduit 41 and valve means 42 are so connected as to provide an air-tight fluid conducting means to nozzle member 56. When the apparatus has been inoperative for a period of time and the clay slip has partially solidified or jelled at the restricted discharge opening of nozzle member 56, the nozzle member may be conveniently and readily cleared for further flow of clay slip by swinging the arm assembly so that the nozzle will discharge into the drip pan and opening the valve means 42 in order to clear and remove the partially jelled clay slip from the nozzle member 56.

While a single, annular band of deposited clay slip is illustrated, it will be understood that a plurality of such bands of any selected width may be deposited upon the porous mold. The invention is not to be limited to a deposited thickness of clay slip on the rim or circumferential margin of an article of dinnerware; it may include depositing clay slip of a selected color in the central or other portion of the article of dinnerware.

It is understood that the apparatus illustrated is exemplary only for showing means employing the method of this invention and that various modifications and changes may be made within the scope of this invention. All such changes and modifications coming within the scope of the appended claims are embraced thereby.

I claim:

1. An apparatus for the manufacture of inlaid dinnerware, comprising: a standard provided with a bracket; a vertical bearing sleeve carried by the bracket; a shaft extending through the sleeve; means carried by the lower end of the shaft operable for driving the shaft; mold-engaging means carried by the upper end of the shaft; an arm assembly pivotally carried by the standard for horizontal movement in a plane above the level of a mold on said mold-engaging means; adjustable stop means for limiting the pivotal movement of the arm assembly; means for biasing the arm assembly against one stop means and away from the mold-engaging means; and valved conduit means carried by said arm assembly, said conduit means being arranged for connection with a source of clay slip.

2. In an apparatus for the manufacture of china: a standard provided with a bracket having an inclined upper face; a vertical bearing sleeve carried by the bracket, said sleeve extending above the upper face of the bracket; a shaft extending through said bearing sleeve; means carried by the lower end of the shaft operable for driving said shaft; mold-engaging and holding means carried by the upper end of the shaft; a circular drip pan provided with an inclined bottom and a central aperture in said bottom, supported upon the upper face of the bracket and encircling the upper end of the shaft and mold-engaging means; and an arm pivotally carried by the standard above the level of the drip pan and valved conduit means carried by the arm.

3. In an apparatus for producing articles of dinnerware including an inlay of ceramic composition of different color than the body of such articles, the combination of: a support means; a rotatable ring adapted to carry a porous mold; drive means for rotating the ring and mold; a supply of clay slip maintained under pressure in proximity to the mold; a rigid arm assembly pivoted on said support means adjacent one side of the ring for movement in a horizontal plane and carrying conduit means connected with the clay slip supply including a valve means; a nozzle member connected to the conduit means and supported by the arm assembly in operative position above the porous mold; and adjustable means on said support means cooperable with the arm assembly for limiting movement of the nozzle member over a preselected area of the mold.

4. An apparatus of the character stated in claim 3 wherein the adjustable means includes arcuately spaced stop members cooperable with the arm assembly.

5. An apparatus of the character stated in claim 3 wherein means adjustably support the nozzle member from the arm assembly in selected position above the mold.

6. In an apparatus for producing articles of dinnerware including an inlay of ceramic composition of different color than the body of such articles, the combination of: support means; a rotatable ring adapted to carry a porous mold; variable drive means for rotating the ring and mold; a supply of clay slip adjacent to the mold; a rigid horizontal arm assembly pivoted from said support means adjacent one side of the ring for movement in a horizontal plane and carrying conduit means connected with the clay slip supply including a valve means; a nozzle member connected to the conduit means and supported by the arm assembly in operative position above the porous mold; and adjustable means carried by said support means cooperable with the arm assembly for limiting movement of the nozzle member over a preselected area of the mold.

7. A method of producing articles of dinnerware including an inlay of ceramic composition of a different color than the body of such articles consisting of: rotating a porous mold; forming a flat flowing stream of distinctively colored clay slip, said flat stream having accurately defined edges and a width narrower than an inlay to be formed; directing said stream onto the surface of the mold at an angle thereto to deposit a thickness of colored clay slip on the surface of the mold; moving said flowing stream radially with respect to the center of rotation of the mold during rotation thereof to deposit a continuous circular inlay of colored slip of desired width; one edge of the flat stream serving to form a sharply delineated natural edge of the inlay; and depositing a bodied clay composition of different color over the inlay and its natural edge and other portions of the mold to form an integral article of dinnerware.

THEODORE E. CAROTHERS.

REFERENCES CITED

The following references are of record in the file of this patent:

UNITED STATES PATENTS

| Number | Name | Date |
| --- | --- | --- |
| 259,724 | Sims | June 20, 1882 |
| 526,669 | McLaughlin | Sept. 25, 1894 |
| 1,469,378 | Burger | Oct. 2, 1923 |
| 1,849,272 | Brown | Mar. 15, 1932 |
| 2,270,075 | Miller | Jan. 13, 1942 |
| 2,321,471 | Emerson | June 8, 1943 |
| 2,384,845 | Miller | Sept. 18, 1945 |